(No Model.) 2 Sheets—Sheet 1.

H. SHOGREN.
TWO WHEELED VEHICLE.

No. 334,991. Patented Jan. 26, 1886.

(No Model.)

H. SHOGREN.
TWO WHEELED VEHICLE.

No. 334,991. Patented Jan. 26, 1886.

Witnesses:

Inventor
Hans Shogren
By his Attorney Chas. H. Fowler

UNITED STATES PATENT OFFICE.

HANS SHOGREN, OF EAST PORTLAND, OREGON.

TWO-WHEELED VEHICLE.

SPECIFICATION forming part of Letters Patent No. 334,991, dated January 26, 1886.

Application filed July 28, 1885. Serial No. 172,911. (No model.)

*To all whom it may concern:*

Be it known that I, HANS SHOGREN, of the city of East Portland, in the county of Multnomah and State of Oregon, have invented certain new and useful Improvements in Vehicles; and I do hereby declare that the following is a full, clear, and exact description of the same, reference being had to the accompanying drawings, in which—

Figure 1:
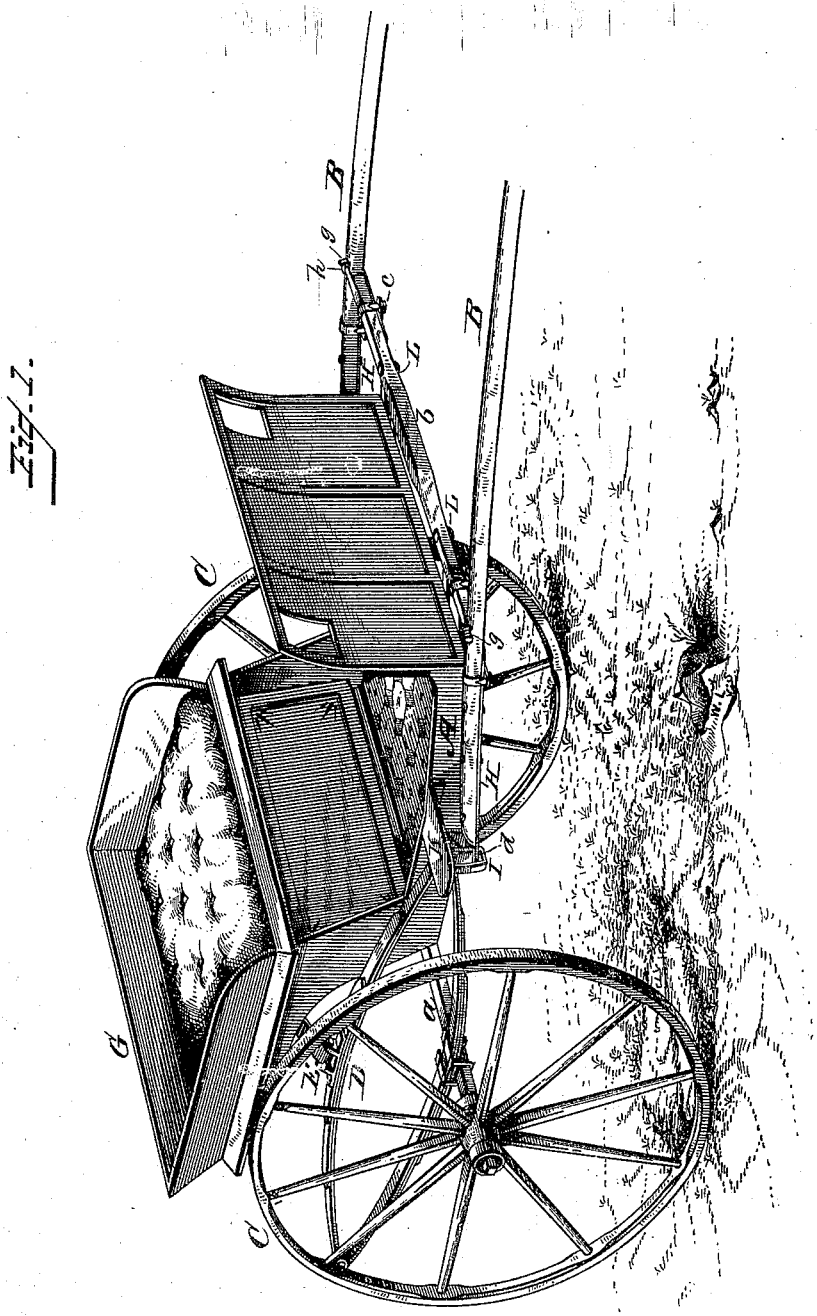
Figure 2:
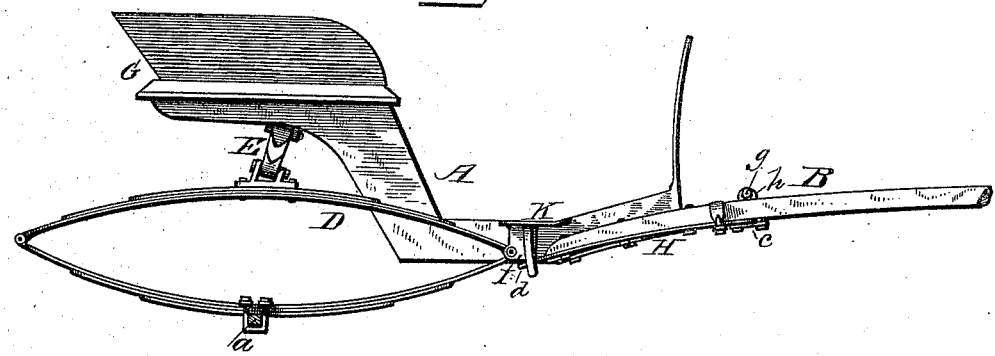
Figure 3:
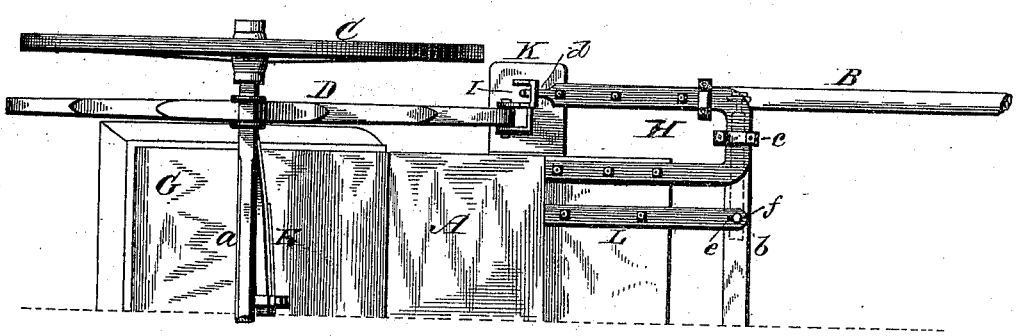
Figure 4:
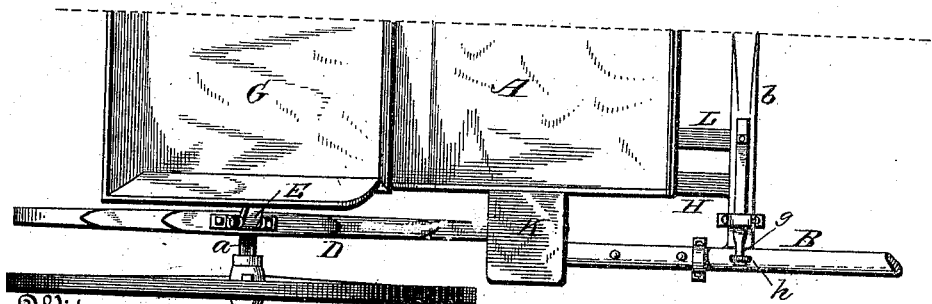

Figure 1 is a perspective view of a vehicle constructed in accordance with my invention; Fig. 2, a side elevation with the wheels removed; Fig. 3, an under plan view showing one half of the vehicle, and Fig. 4 a similar top plan view.

The present invention has relation to certain new and useful improvements in sulkies, road-carts, and other vehicles; and it consists in the details of construction, substantially as shown in the drawings, and hereinafter described and claimed.

In the accompanying drawings, A represents the body of a two-wheel vehicle, of any of the usual forms, provided with the shafts B and supported by wheels C. The axle $a$ has connected to it by suitable clips the side springs, D, and to the upper part of these springs, about midway of their ends, are hinged or pivoted a transverse spring, E. This spring E is suitably connected to the under side of the seat G, and forms a support for the seat, and is set obliquely, so that it shall not bind when compressed or hamper the action of the several parts of the vehicle when in motion.

To the under side of the body A are connected by suitable means one end of U-shaped springs H, the opposite ends thereof being secured to the shafts B, and the outer extremities to the cross-bar $b$ of the shafts by the clips $c$. The springs H are constructed of flat steel, and the ends which are attached to the shafts B terminate in fingers $d$, which, if preferred, may be slightly curved in a downward direction. These fingers $d$ are located in brackets I, which form guides and stops for the same, and also means for pivoting the front ends of the side springs, D, said brackets depending from the vehicle-steps K.

To prevent accident in case the springs should break, a harness is made by means of two metal bars, L, attached to the under forward part of the body A by bolts or other like means. The forward end of the bars L have formed therein elongated slots $e$, through which pass bolts $f$, for attaching the ends of the bars to the cross-bar $b$ of the shafts, thus enabling a freedom of motion in a vertical direction when the springs are at work in their proper position; but should a spring break, the body A immediately rests on the bars, and its weight is supported by the heads of the bolts $f$. The ends of the U-shaped springs H, to which the shafts B are attached, hold them in position, as do also the hooks $g$, engaging with staples $h$ on the shafts, said hooks being formed with shanks for attachment to the cross-bar $b$, thereby preventing accident from breaking of the springs.

The bars L and hooks $g$ form no part of the draft arrangement unless the springs break, and are principally employed to support the body, if required, in case of accident, the draft being constantly in the springs, which form a draft-coupling and support to the forward part of the body and a coupling for the shafts. The cross-bar $b$ is in no way fastened to the shafts B, except by the springs H and the hooks $g$, and when the springs are broken the shafts are still held in place by the hooks; but in reality the hooks do not act as fastenings to hold the shafts in place only upon the breaking of said springs.

The principal use of the springs H in connection with the body and shafts of a vehicle is to prevent a rocking motion of the seat when the animal rises in trotting or walking.

Any suitable means may be employed for attaching the side springs, D, to the axle $a$ and brackets I, also the spring E to the side springs and to the under side of the seat G, and the bracket can be of any desirable construction, so long as it serves the purpose intended.

Having now fully described my invention, what I claim as new, and desire to secure by Letters Patent, is—

1. In a two-wheel vehicle, the side elliptic springs thereof connected to the axle, and at its forward end connected to brackets depending from the vehicle-steps, in combination with a transverse leaf-spring arranged obliquely and connected to the under side of the seat and at its ends to the side springs, substantially as and for the purpose set forth.

2. In a two-wheel vehicle, the combination, with the body thereof, of a harness for attaching it to the cross-bar of the shafts, consisting of metal bars secured at their rear ends to the body and to the cross-bar by headed bolts passing through elongated slots in the bars constituting the harness, substantially as and for the purpose described.

3. In a two-wheel vehicle, a harness for attaching the body to the cross-bar of the shafts, consisting of metal bars secured to the under side of the body and provided with elongated slots at their forward ends, and headed bolts extending through the slots for connecting the bars to the cross-bar of the shafts, in combination with means for attaching the cross-bar and shafts together, consisting of hooks and staples, substantially as and for the purpose specified.

4. In a two-wheel vehicle, the combination, with the body, shafts, and cross-bar thereof, of U-shaped springs connected to the cross-bar, one end or arm of each spring being connected to the body and the opposite end or arm to the shaft, substantially as and for the purpose described.

5. In a two-wheel vehicle, the combination of U-shaped springs, each of which is attached to the vehicle-body, the shafts, and the cross-bar thereof, as shown, the outer arms or ends of the springs terminating in fingers, and brackets to form guides for the fingers, substantially as and for the purpose set forth.

6. In a two-wheel vehicle, U-shaped springs attached, as shown, to the vehicle-body, the shafts, and cross-bar thereof, in combination with a harness for attaching the body to the cross-bar, consisting of slotted bars and headed pins or bolts, substantially as and for the purpose described.

7. In a two-wheel vehicle, the combination of side springs attached to the axle and at their forward end to brackets, a transverse spring attached thereto and to the under side of the seat, U-shaped spring connected to the vehicle-body, the shafts, and cross-bar thereof, and a harness for attaching the body to the cross-bar, consisting of slotted bars and pins or headed bolts, substantially as and for the purpose set forth.

HANS SHOGREN.

Attest:
A. C. TALBOT,
CHAS. B. TALBOT.